United States Patent
Hershberger

(10) Patent No.: US 10,407,132 B2
(45) Date of Patent: Sep. 10, 2019

(54) DEVICE AND METHOD FOR SECURING A COVER TO A STRUCTURE

(71) Applicant: John Hershberger, Hillsboro, OH (US)

(72) Inventor: John Hershberger, Hillsboro, OH (US)

(*) Notice: Subject to any disclaimer, the term of this patent is extended or adjusted under 35 U.S.C. 154(b) by 99 days.

(21) Appl. No.: 15/226,944

(22) Filed: Aug. 3, 2016

(65) Prior Publication Data

US 2018/0035764 A1    Feb. 8, 2018

(51) Int. Cl.
*A44B 17/00* (2006.01)
*B63B 17/02* (2006.01)

(52) U.S. Cl.
CPC .................................. *B63B 17/02* (2013.01)

(58) Field of Classification Search
CPC ....... B63B 17/02; F16B 5/0692; A44B 17/00; Y10T 24/2157; Y10T 24/45942; Y10T 24/45288; Y10T 24/4589
See application file for complete search history.

(56) References Cited

U.S. PATENT DOCUMENTS

| | | | | |
|---|---|---|---|---|
| 1,645,499 A | * | 10/1927 | Fenton | A47C 31/026 24/356 |
| 1,778,677 A | * | 10/1930 | King | A47C 31/026 24/356 |
| 2,961,725 A | * | 11/1960 | McGee | B63B 17/02 114/361 |
| 3,088,295 A | * | 5/1963 | Haines | A44B 1/04 24/108 |
| 4,507,344 A | * | 3/1985 | Baughman | A44C 3/001 24/103 |
| 5,095,636 A | * | 3/1992 | Arnold | B63B 17/02 114/361 |
| 5,490,309 A | * | 2/1996 | Velasquez | A41B 11/002 24/102 SL |
| 7,290,312 B2 | * | 11/2007 | Kawensky | B63B 17/02 24/301 |
| 8,402,618 B2 | * | 3/2013 | Veldhoen | F16B 5/0692 24/684 |
| 9,675,142 B1 | * | 6/2017 | Hendricks | A44B 17/0023 |
| 9,777,756 B2 | * | 10/2017 | Oakes | F16B 1/00 |

* cited by examiner

*Primary Examiner* — Robert Sandy
*Assistant Examiner* — Louis A Mercado
(74) *Attorney, Agent, or Firm* — R. William Graham

(57) ABSTRACT

A device and a method for attaching a cover to a structure includes a female snap having a central open surface to receive by friction fit a complementary male snap, a lever connected to the female snap, wherein the lever extends sufficiently out from the female snap to enable one to gain grasp of the lever, and a pin having a piercing portion which serves to retain a fabric material.

7 Claims, 3 Drawing Sheets

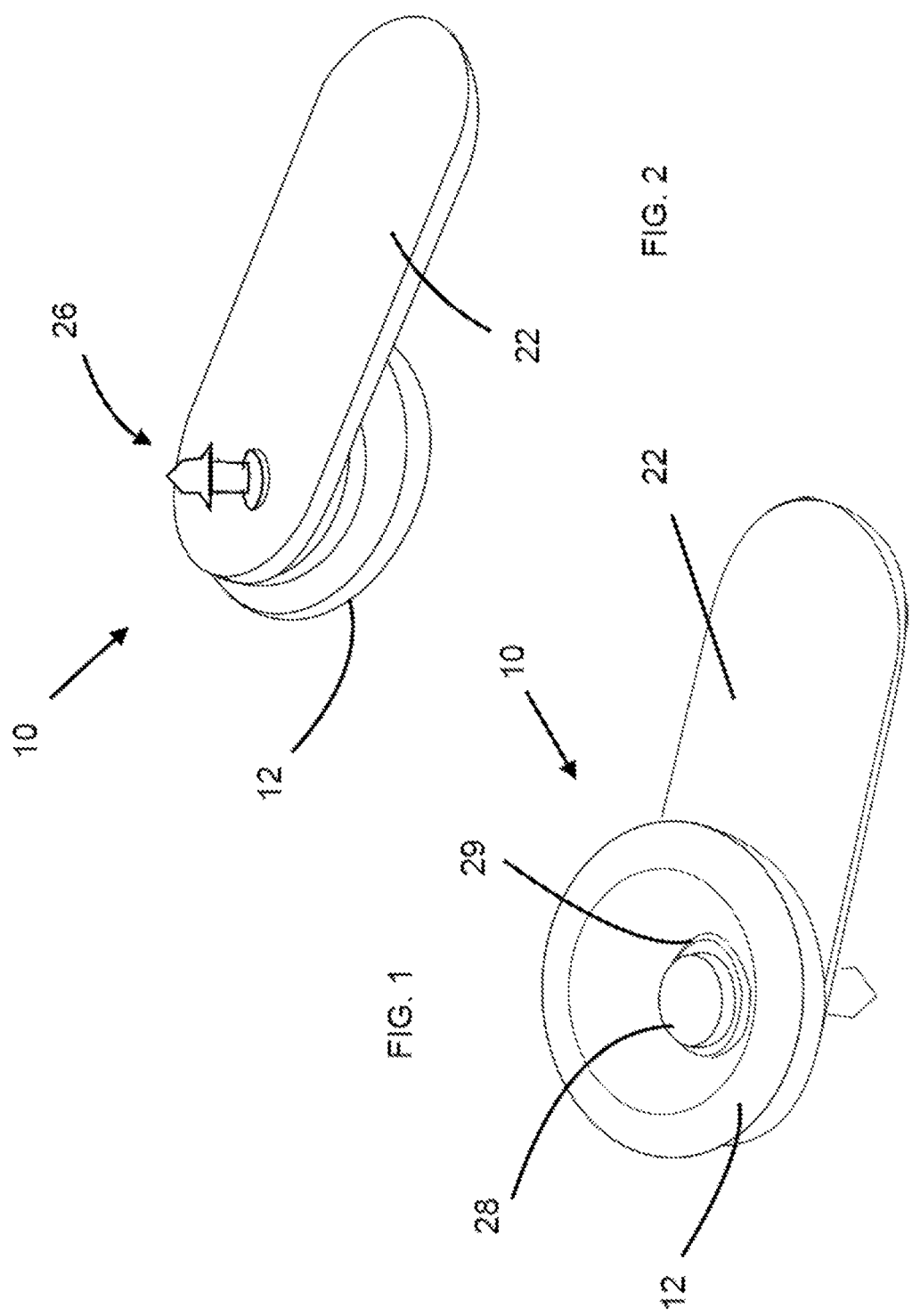

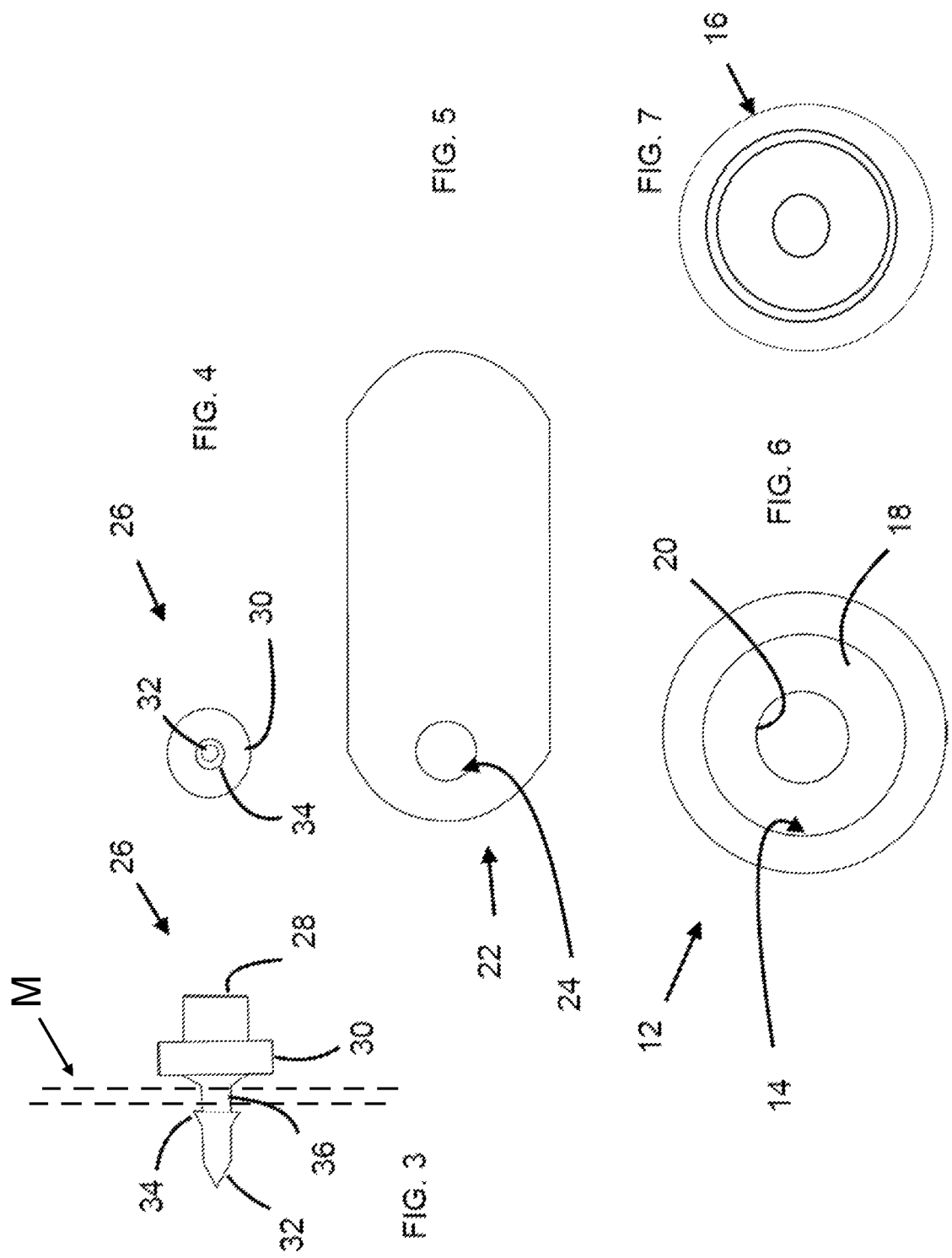

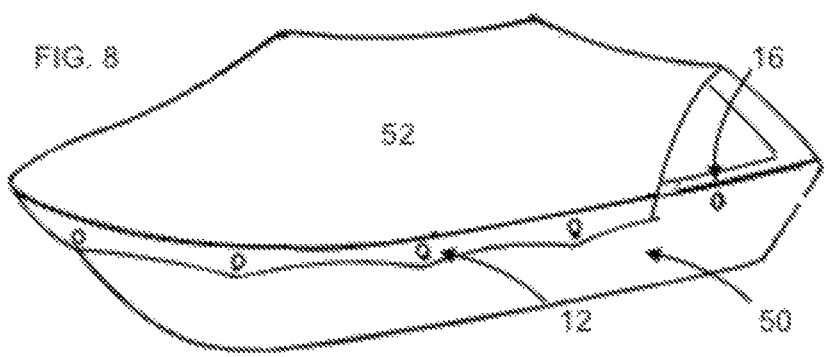

DEVICE AND METHOD FOR SECURING A COVER TO A STRUCTURE

FIELD OF THE INVENTION

The invention relates to a device and method for securing a cover to a structure, such as a boat, and more particularly, to a device and method using quick fit pin with a flared neck and connected lever for doing same.

BACKGROUND OF THE INVENTION

A cover is typically secured to the boat for storage and to protect certain portions of same from water, the elements (i.e., rain and snow), animals, and other undesired factors (debris, etc.). Typically, the boat cover includes a plurality of female snap fasteners ("sockets") which snap to male snap fasteners ("studs") on the boat.

The cover is suitably positioned over the boat with a female snap fastener positioned over the corresponding male snap fastener, and a force is applied on the female snap fastener towards the boat. The female snap fastener is secured to the corresponding male snap, and each adjacent set of fasteners is secured until the entire cover is secured.

This snap fit system is the current state of the art in cover and remains effective. A problem arises when such covers require replacement. Currently, cover repair is achieved using a conventional quick fit pin. This pin includes a female snap with a brass pin affixed to the outside of the female snap. The pin pierces part of a new tarp or cover material to hold it in place while retrofitting a new cover in place of the old. The pin works effectively. However, the pin and associated female snap are difficult to remove from the male snap after retrofitting is complete. Typically, a screwdriver work pry tool is required for removal of this piece. Many times the pin is broken off of the female snap portion during the removal process. This is also time-consuming for the repair man as such a device and method are believed to consume too much time and take too much effort.

An improved removal device and method are desired. Accordingly, the present invention is directed to providing a device and a method that can provide a novel quick fit pin design for boat cover repair/replacement. The device and method can also be used for other tent and tarp repair or replacement.

SUMMARY OF THE INVENTION

It is an object to improve the method and device for repair of covers, tarps or tents which employ a snap connection.

It should be appreciated that the present invention can also be used in connection with structures that utilize removable covers, such as covers for convertible tops on automobiles, storage containers and other open structures that can benefit from removable covers.

The present invention is directed to a device and method for securing a cover. A preferred embodiment of the device includes a quick fit pin having flared taper and a lever connected thereto. In an one embodiment, there is provided a female snap having a central open surface to receive by friction fit a complementary male snap. The female snap has a back with an opening defined therethrough. A lever in the form of a rigid plate, for example, includes and opening at one end thereof which extends through the lever. This opening can be co-aligned with the opening on the back of the female snap. When so aligned and when the lever is connected to the female snap, the lever extends sufficiently out from the snap to enable one to gain grasp of the same.

A pin includes a base having a diameter to fit through the co-aligned openings. A collar is formed above the base and has a diameter larger than the opening on the lever thus precluding the pin from passing therethrough. Extending upward from the collar is a piercing portion which includes a flared taper which forms a neck between the flared taper and collar and serves to retain the fabric material. The portion of the base extending through the openings can be stamped in a manner to deform the base portion causing it to be widened and thus lock the pin in place along with the lever sandwiched in between the collar and the back of the female snap. It is contemplated that this device can be made from components or integrally formed by a stamping process.

The present invention provide a method of retrofitting a boat, or other object, to replace an existing cover. The method may include the steps of securing a plurality of the above described quick fit pin with associated levers to male snaps of boat, securing parts of a cover to the quick fit pin with associated lever, and removing the quick fit pins by means of the lever connected thereto.

A device according to one or more embodiments is beneficial for a variety of reasons. The use of the quick fit pin with associated lever is believed to require less time and energy to perform repair/replace a cover of a boat.

It is to be understood that the aspects and objects of the present invention described above may be combinable and that other advantages and aspects of the present invention will become apparent to those having ordinary skill in the art upon reading the following description of the drawings and the detailed description thereof.

BRIEF DESCRIPTION OF THE DRAWINGS

FIG. 1 is a front perspective view of a quick fit pin and associated lever of the instant invention.

FIG. 2 is a back perspective view of a quick fit pin and associated lever of the instant invention.

FIG. 3 is a side view of a pin of the instant invention.

FIG. 4 is top view of the pin in FIG. 3.

FIG. 5 is a top plan view of a lever of the invention.

FIG. 6 is a top view of a female snap of the invention.

FIG. 7 is a top view of a male snap.

FIG. 8 is perspective of a typical boat with a boat cover.

The present invention will become more fully apparent from the following description and appended claims, taken in conjunction with the accompanying drawings. Understanding that the accompanying drawings depict only typical embodiments, and are, therefore, not to be considered to be limiting of the scope of the present disclosure, the embodiments will be described and explained with specificity and detail in reference to the accompanying drawings as provided below.

DETAILED DESCRIPTION OF THE DRAWINGS

Referring to the drawings, the present invention is directed to improving the method and device for repairing covers, tarps or tents which employ a snap connection. For example, the present invention can also be used in connection with structures that utilize removable covers, such as covers for convertible tops on automobiles, storage containers and other open structures that can benefit from removable covers.

As can be seen in FIG. 8, boat 50 typically includes a plurality of male snap fasteners 16 secured to outer surface of boat 50, such as a screw. A boat cover 52 includes a plurality of female snap fasteners 12 secured to cover 52.

The device is generally designated by the numeral 10 and its components can be made of stainless steel, for example, and can be multiple and connected mechanically or integrally formed through a known process such as stamping. In an exemplary embodiment, the device 10 is provided a female snap 12 having a central open surface 14 to receive by friction fit a complementary male snap 16. The female snap 12 has a back 18 with an opening 20 defined therethrough. A lever 22 can be in the form of a rigid plate, for example, and includes and opening 24 at one end thereof which extends through the lever 12. This opening 24 can be co-aligned with the opening 20 on the back 18 of the female snap 12. When so aligned and when the lever 22 is fixably connected to the female snap 12 as will be described, the lever 22 extends sufficiently out from the snap 12 to enable one to gain grasp of the same and provides a handle for applying leverage.

Also provided is a pin 26 which includes a base 28 having a diameter to fit through the co-aligned openings 20, 24. A collar 30 is formed above the base 28 and has a diameter larger than the opening 24 on the lever 22 thus precluding the pin 26 from passing therethrough. Extending upward from the collar 30 is a piercing portion 32 which includes a flared taper 34 which forms a neck 36 between the flared taper 34 and collar 30 and serves to retain fabric material M of the new cover to be formed. The flared taper 34 can provide a slight ridge over which the fabric must pass. This ridge can be 0.015 inch lager than a diameter of the neck 36 to serve the purpose of the retaining the material, yet still permits its removal with some force without damage thereto. A portion 29 of the base 28 extending through the openings 20, 24 can be stamped in a manner to deform the base portion 29 causing it to be widened and thus lock the pin 26 in place along with the lever 22 sandwiched in between the collar 30 and the back 18 of the female snap 12. Again, it is contemplated that this device 10 can be made from components or integrally formed by a stamping process.

The present invention provide a method of retrofitting an object, such as a boat, to replace an existing cover. The method may include the steps of securing a plurality of the above described device 10 to male snaps 16 on the boat, securing parts of a cover to the device 10, and removing the device 10 by means of the lever 22 connected thereto.

A device according to one or more embodiments is beneficial for a variety of reasons. The use of the device 10 is believed to require less time and energy to perform repair of a snapped cover of an object.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Reference throughout this description to features, advantages, objects or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, any discussion of the features and advantages, and similar language, throughout this specification may, but does not necessarily, refer to the same embodiment.

These and other benefits should be readily apparent to those of ordinary skill in the art. It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A device for securing a replacement cover material to a rigid structure, comprising:
    a female snap having a central open surface to receive by friction fit a complementary male snap;
    a lever connected to said female snap, wherein said lever extends sufficiently out from said female snap to enable one to gain grasp of said lever; and
    a pin having a piercing portion which serves to retain the replacement cover material, wherein said female snap has a back with an opening defined therethrough; said lever having an opening at one end thereof which extends through said lever, said opening on said lever being co-aligned with said opening on said back of said female snap; and wherein said pin includes a base portion having a diameter to fit through said co-aligned openings, a collar formed above said base portion and having a diameter larger than said opening on said lever thus precluding said pin from passing therethrough, extending upward from said collar is flared taper and said piercing portion which serves to retain the replacement cover material, said base portion extending through said openings frictionally engaging said back to lock said pin in place along with said lever sandwiched in between said collar and said back of the female snap, wherein said base portion being stamped in a manner to deform said base portion causing it to be widened and thus lock in place said pin.

2. The device for securing the replacement cover material to the rigid structure of claim 1, wherein said pin includes said-flared taper inwardly from said piercing portion and extending radially outward from said pin and which forms a neck between said flared taper and said back, said flared taper having a diameter sufficient to retain the cover material once pierced and has a slight ridge over which the cover material must pass to serve a purpose for retaining the cover material while permitting removal thereof without damage thereto.

3. The device for securing the replacement cover material to the rigid structure of claim 1, wherein said lever is in a form of a rigid plate.

4. A device for securing a cover to a structure, comprising:
    a female snap having a central open surface to receive by friction fit a complementary male snap; and
    a pin having a piercing portion which serves to retain a replacement cover material, wherein said pin includes a flared taper between an end of said piercing portion and said female snap and which forms a neck therebetween and serves to retain said replacement cover material in said neck, which includes a lever connected to said female snap, wherein said lever extends sufficiently out from said female snap to enable one to gain grasp of said lever, wherein said female snap has a back with an opening defined therethrough; said lever having an opening at one end thereof which extends through said lever, said opening on said lever being co-aligned with said opening on said back of said female snap; and wherein said pin includes a base portion having a diameter to fit through said co-aligned openings, a collar formed above said base portion and having a diameter larger than said opening on said lever thus precluding said pin from passing therethrough, extending upward from said collar is said flared taper and said piercing portion, said base portion extending through said openings frictionally engaging said back to lock said pin in place along with said lever sandwiched in between said collar and back of the female snap, wherein said base portion being stamped in a manner to deform said base portion causing it to be widened and thus lock.

5. The device for securing the replacement cover material to the structure of claim 4, wherein said lever in a form of a rigid plate.

6. A method for securing a replacement cover material to a rigid structure, which includes the steps of:
    providing a rigid structure with male snaps exposed thereon;
    securing a device for securing the replacement cover material to said male snaps of the structure, the device having a complementary number of female snaps, where each of said female snap has a central open surface to receive by friction fit a complementary of said male snap; a lever connected to said female snap, wherein said lever extends sufficiently out from said female snap to enable one to gain grasp of said lever;
    and a pin having an end piercing portion extending outward from a back of said female snap in an exposed manner which serves to pierce and retain the replacement cover material, securing a part of the replacement cover material to said device by piercing said replacement cover material, and removing said device from said male snaps by means of each said lever.

7. The method for securing the replacement cover material to the rigid structure of claim 6, wherein said pin includes a flared taper inwardly from said end piercing portion and extending radially outward from said pin and which forms a neck between said flared taper and said female snap, said flared taper having a diameter sufficient to retain the replacement cover material once pierced and has a slight ridge over which the replacement cover material must pass to serve a purpose to retain the replacement cover material while permitting removal thereof without damage thereto.

* * * * *